Nov. 7, 1939.                H. L. PITMAN                2,178,702
            COMBINED TYPEWRITING AND COMPUTING MACHINE
                    Filed Aug. 1, 1936        5 Sheets-Sheet 1
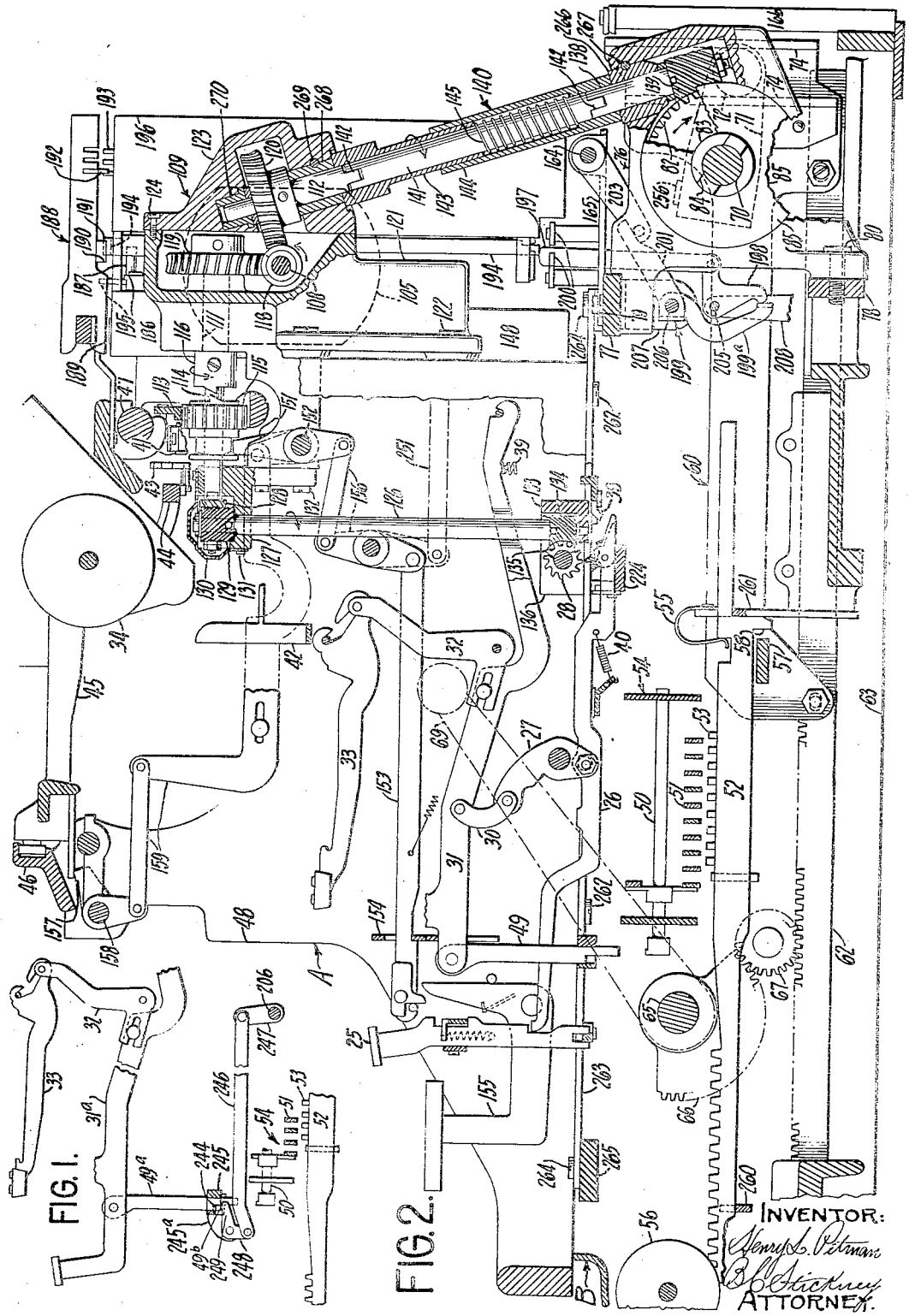

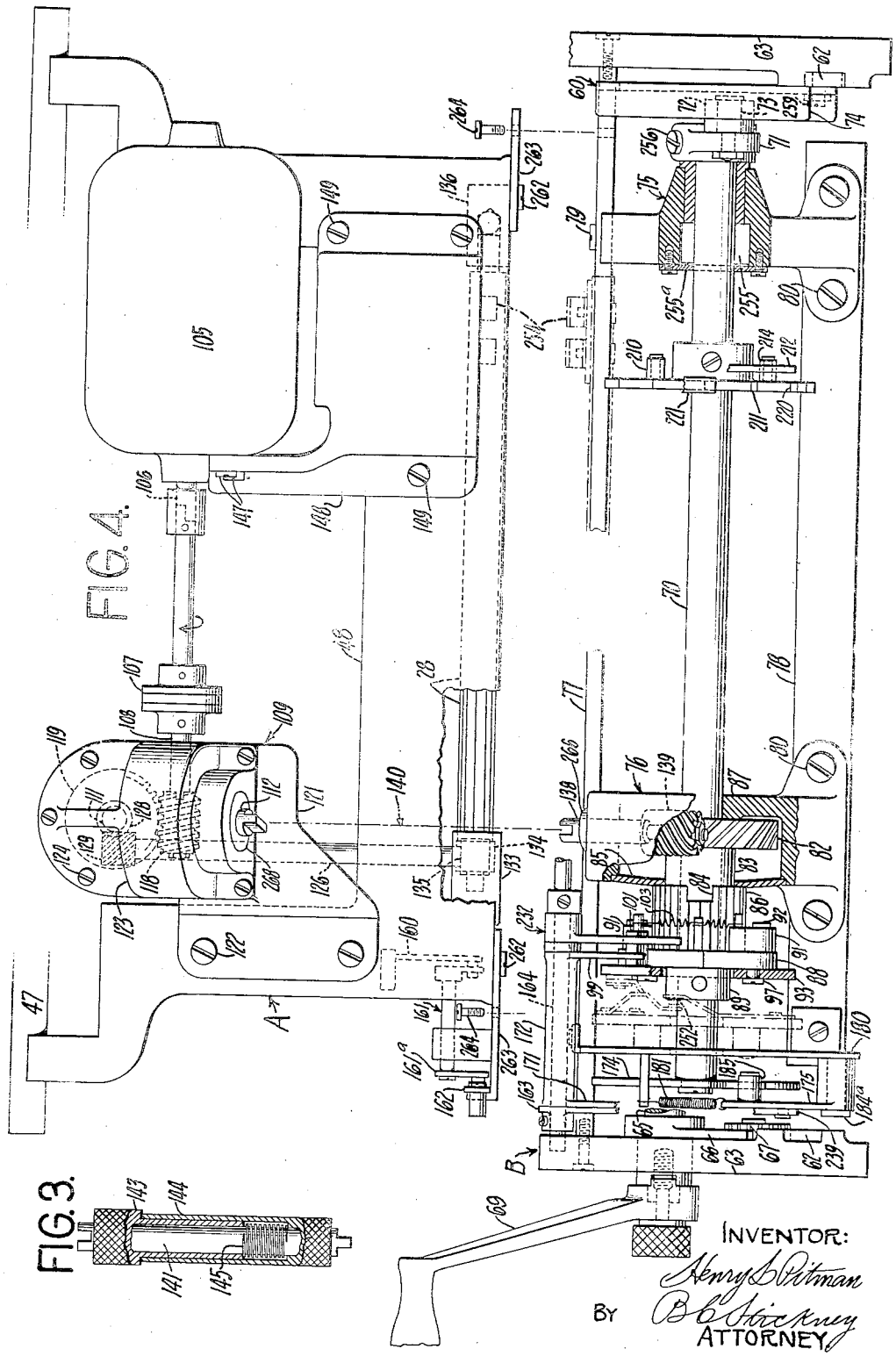

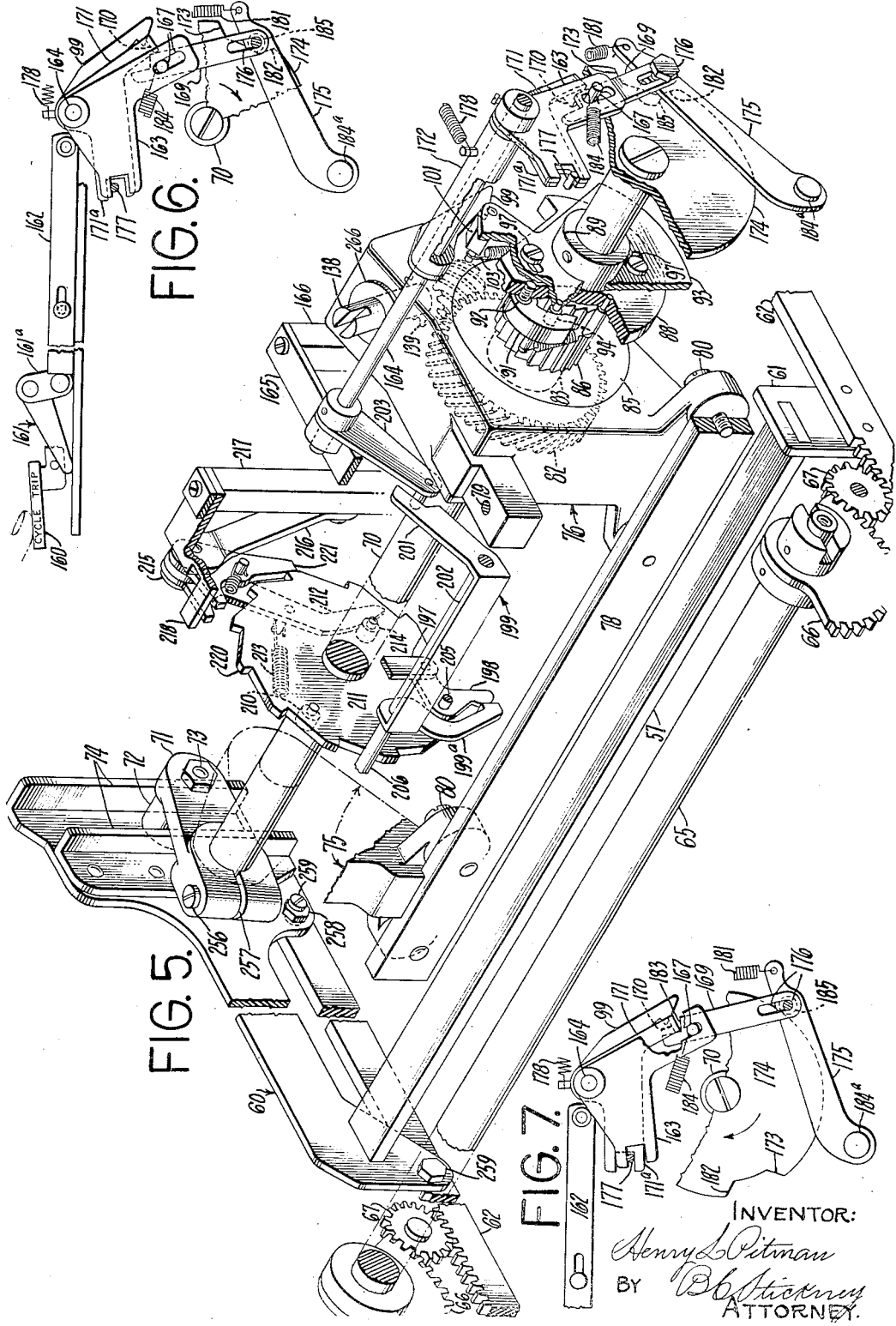

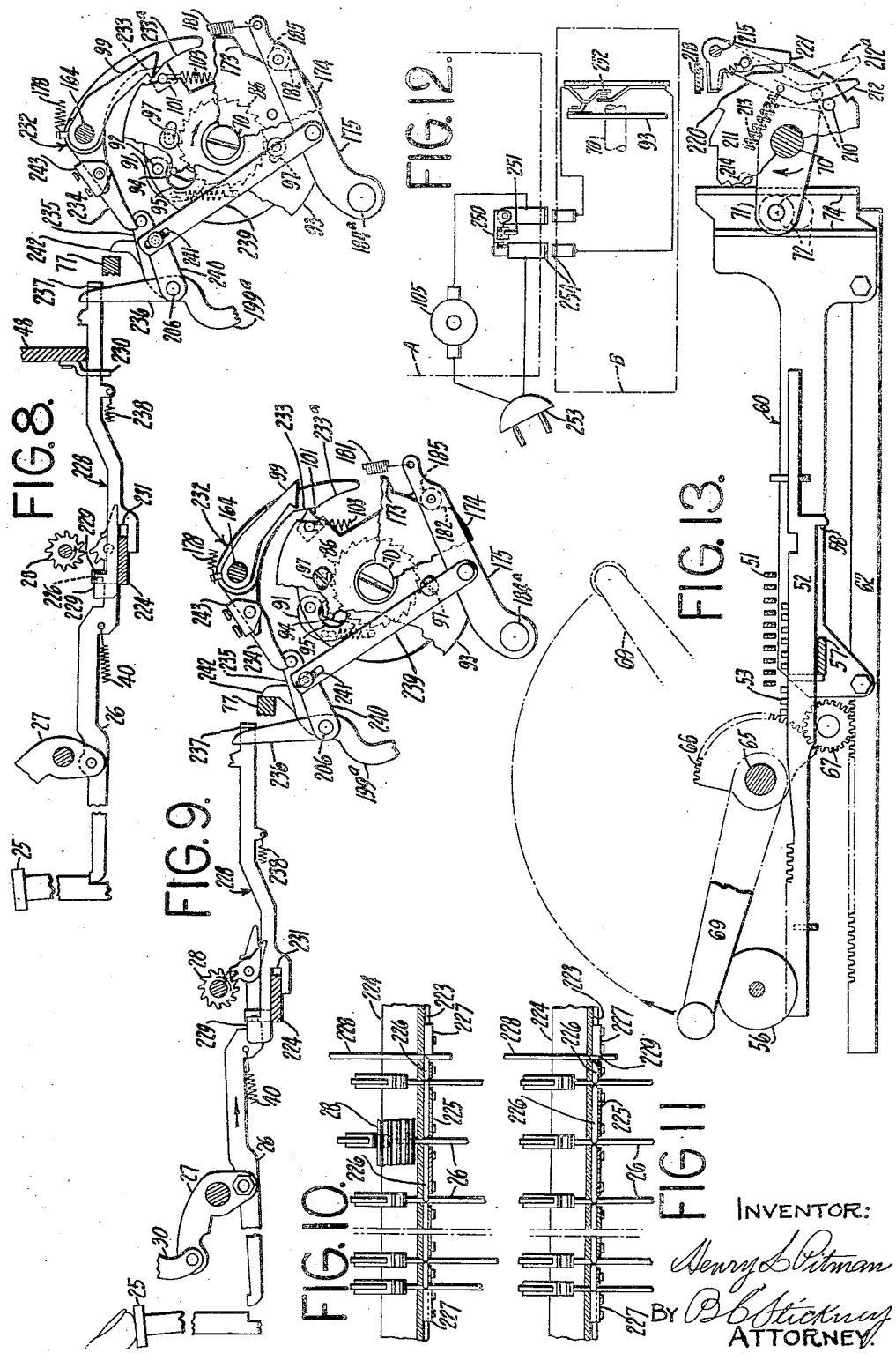

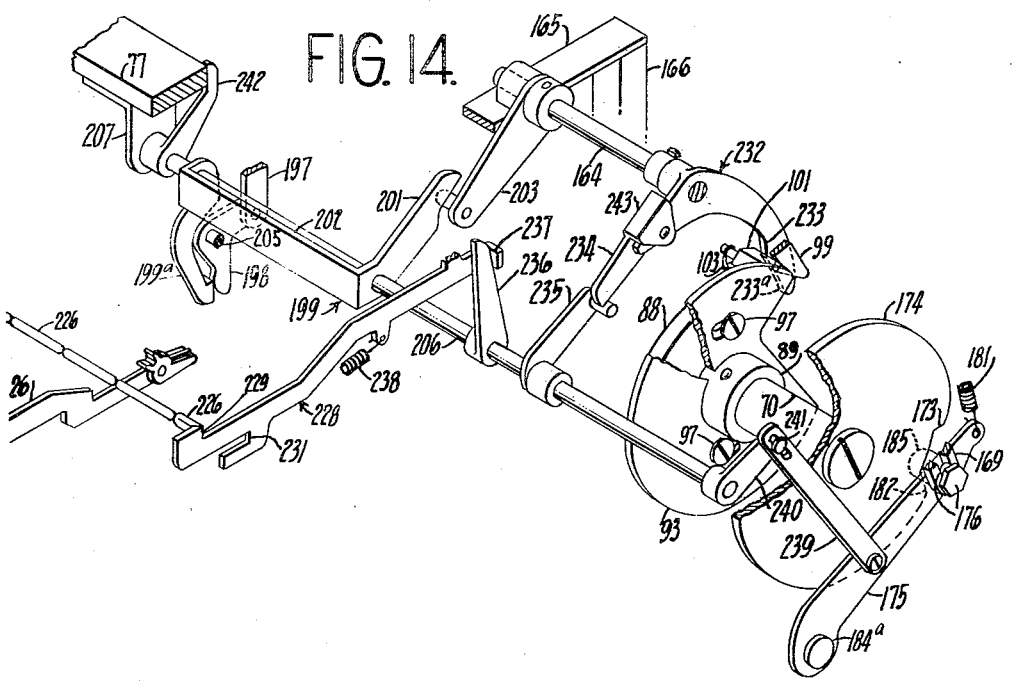

Patented Nov. 7, 1939

2,178,702

UNITED STATES PATENT OFFICE 2,178,702

COMBINED TYPEWRITING AND COMPUTING MACHINE

Henry L. Pitman, Hartford, Conn., assignor to Underwood Elliott Fisher Company, New York, N. Y., a corporation of Delaware Application August 1, 1936, Serial No. 93,820

2 Claims. (Cl. 235—60)

This invention relates to combined typewriting and computing machines of the Underwood-Hanson class and deals with improvements in motor transmission mechanism, employed for operating a typewriter-carriage-return mechanism, a type-action operator, and a cycling mechanism for the general operator provided in the computing base of such machine.

The invention is in the nature of an improvement over the motor transmission organization disclosed in my application Serial No. 15,789, filed April 11, 1935.

In said class of machine a typewriter-unit surmounts a computing base having reciprocatory register-bars. Said register-bars operate computing wheels, and are indexable at operation of the digit type-actions or trains and under denomination-selecting control of the typewriter-carriage; the indexing being preparatory to cycling the register-bars by means of the general operator in the computing base.

An important improvement results from placing the motor in the typewriter-unit and providing connections enabling the so placed motor to drive not only the carriage-return mechanism and type-action operator but also to drive the general operator in the underlying computing base. Said improvement comprehends locating the motor in the Underwood typewriter-unit for operating carriage-return mechanism as exemplified in my Patent No. 1,679,741, dated August 7, 1928, and providing transmission mechanism enabling such motor to also operate the general operator in the underlying computing base; and such motor may also be coupled to the type-action operator in the typewriter-unit.

Among the resulting advantages are the following: The computing base itself becomes rid of the motor, heretofore included therein, and this is feasible because the general operator may be operated manually when it is desired to test certain functions of the computing base while the latter is separated from the typewriter-unit. Furthermore, the typewriter unit may be tested, while separated from the computing base, for power operation of the carriage-return mechanism, or of the type-action operator. Another advantage is that the absence of the motor from the computing base facilitates management of the computing base in the assembling and servicing of the computing base. Still another advantage is that placing the motor in the typewriter-unit conduces to compacting and simplifying the cycling mechanism in the computing base.

The computing base general operator is reciprocated by means of a cycling power-operated crank. In manual operation of the general operator, the latter may drive the crank idly, it being a further feature of the invention to provide means for aiding the idly driven crank over its dead-center positions at the extremes of the general operator advance and return strokes. This provision renders it unnecessary to disconnect and reconnect the crank and general operator relative to manual and power operation of the general operator.

At cycling the general operator manually the crank will be idly driven a complete revolution, and a simple pawl and ratchet may co-operate with said crank as a full-stroke device for preventing untimely reversal of the general operator advance or return stroke.

A cycle-gaging clutch between the motor and general operator crank includes a device trippable to cause closing of the clutch for an ensuing cycle of the generator operator. A further feature of the invention resides in a novel interlock working between said trippable device and the typewriter digit type-actions as follows. Should an attempt occur to trip said device while a digit type-action is being operated, said device will be tripped or released but the cycle will be held up until return of the type-action to normal position. Conversely, tripping of said device is immediately effective to cause said interlock to lock the type-actions. Thus, should the clutch be tripped while the motor is inoperative, as when disconnected from the power line, the type-actions will be locked immediately instead of the locking waiting, as heretofore, upon a cycle of the machine, and liability of jamming the machine upon reconnecting the motor to the line while the clutch is tripped is obviated.

Other features and advantages will hereinafter appear.

In the accompanying drawings:

Figure 1 is a sectional side view of a portion of the interlock as arranged for hand-operated type-actions.

Figure 2 is a cross-sectional side view of the typewriter and computing base, showing principally the novel power-transmission mechanism.

Figure 3 is a partly sectioned view of a transmission coupling used between the typewriter and computing base.

Figure 4 is a partly sectioned rear view of the computing base and the typewriter detached from one another to illustrate the detached typewriter as being complete with the motor, and the computing base as being operable by the usual handle.

The view also shows details of the motor-transmission mechanism.

Figure 5 is a perspective of the general operator and transmission mechanism in the computing base.

Figure 6 is a side view of the clutch-tripping train and a cycle-repetition-preventing device as conditioned by depressing the cycle-tripping key.

Figure 7 is similar to Figure 6, showing further conditioning of said device, during the general-operator cycle, to prevent repetition of the latter.

Figure 8 is a side elevation showing the interlock locking the type-actions consequent to tripping and closing of the clutch.

Figure 9, similar to Figure 8, shows the interlock operating to arrest the trip and prevent closure of the clutch while a type-action is being operated.

Figure 10 is a plan view representing a series of lock-rods of the interlock and companion devices operated to prevent closure of the cycling clutch while a type-action is being operated.

Figure 11, similar to Figure 10, represents the locking of the type-actions consequent to tripping the clutch.

Figure 12 is a diagram of circuits for a machine using the motor intermittently, that is, only for carriage returning and computing-base cycling.

Figure 13 is a side elevation of the manually-operated general operator at the extreme of its advance stroke and shows the device operating to aid the idly driven crank past its dead-center position.

Figure 14 is a perspective of the interlock, showing details of arrangement.

In a typewriter A which surmounts computing base B, Figure 2, depression of a digit-key 25 rocks a draw-link 26, pivoted on lever 27, to bring its rear end into engagement with a continuously rotating power-shaft or type-action operator 28. The resulting rearward movement of said draw-link 26 works through said lever 27, link 30, main lever 31 and bell-crank 32 to swing type-bar 33 in a printing stroke to a platen 34. Just before the end of the printing stroke, said draw-link 26 encounters a fixed abutment 38, and thereby becomes disconnected from said power-shaft 28 preparatory to the type-action recoil which is aided by springs 39, 40. The described type-actions or trains and operation thereof by said power-shaft 28 are substantially as set forth in my application Serial No. 42,611, filed September 28, 1935.

The usual universal bar 42, escapement devices 43 and feed-rack 44 co-operate with any type-action to letter-feed a platen-carriage 45 having the usual driving spring 41 and running on rails 46, 47 of typewriter main frame 48.

At operation of any digit type-action or train a pendent 49, on main lever 31, rocks a digit-shaft 50 to depress a transverse pin-setting bar 51. Register-bars 52 are slightly advanced seriatim, from the Figure 2 position by means of denominational trains (not fully shown) having jacks 191, Figure 2, traversed by the carriage at a computing zone, to bring digit-pins 53, on said register bars, under the pin-setting bars 51, whereby said depression of one or another of the latter sets a corresponding digit-pin in the appropriate register-bar. The pin-setting bars 51, the digit-shafts 50 and their connections are part of the usual pin-setting unit 54, exemplified in my Patent 1,927,951, issued September 26, 1933, said patent also showing an example of said denominational trains. Each register-bar has the usual spring device 55 to retract it after its slight advance to pin-setting position.

Following the indexing or pin-setting operations a general operator is reciprocated to drive the register-bars 52 and rotate computing wheels 56. Said general operator includes a transverse bar 57 which in the advance stroke engages the set digit-pins 53 for advancing the register-bars, and, in the return strokes, engages register-bar shoulders 58 for restoring the register-bars. The spring devices 55 restore the register-bars beyond the return position reached by said transverse bar 57, see Figure 2. By means of left and right side plates 60, 61, Figure 5, said transverse bar 57 is connected to the usual side racks 62 guided adjacent to side members 63 of the computing base framework. The usual cross-shaft 65, sectors 66 and intermediate pinions 67 connect said racks 62 to move the latter and the transverse bar 57 as a unit. The usual handle 69 is removably attached, Figure 4, to said cross-shaft 65.

A power operable shaft 70 extends transversely at the back of the computing base, Figures 2, 4, and 5, and has a crank 71 to reciprocate the general operator. A roller 72 on a stud 73 of the crank arm, Figures 4 and 5, works in a groove of the general operator side plate 60, the latter having groove-forming flanges 74 against which said roller 72 works. Thus a complete clockwise revolution of said shaft 70 and its crank 71 relative to the normal Figure 2 position imparts a forward and return stroke to the general operator structure. Said shaft 70 is journalled in a bearing unit 75, adjacent the crank 71, and in a gear-housing 76, both supported by upper and lower cross-members 77, 78 of the computing-base framework and attached thereto by screws 79, 80, Figures 2 and 4.

The housing 76 encloses a gear 82 whose hub 83 has a key 84 projecting through a side wall 85 of said housing to drive a tooth-clutch member 86. Said gear 82 and clutch member 86 are power-driven as will presently be described and are normally free to rotate together independently of and on said shaft 70. The gear 82 and clutch-member 86 are retained laterally between a gear housing wall 87 and a plate 88 fastened by its hub 89 to said shaft 70. Said plate 88 mounts spring-pressed clutch pawls 91 on pivots 92 and has openings 95, Figures 8 and 9, through which pawl-controlling studs 94 on a plate 93 extend. Said pawl-controlling plate 93 is rotatable relatively to the plate 88 between one position, Figure 5, in which the studs 94 hold the clutch pawls 91 disengaged from the tooth-member 86, and another position in which said studs 94 clear the spring-pressed clutch pawls 91 for resulting spring-pressed engagement with said tooth-member 86 as in Figure 8. Slot and stud connections 97 retain the plate 93 adjacent the pawl-plate 88 and limit the relative rotation of said plate 93 to one or another of said positions. A trip-arm 99 normally holds the plate 93 in open-clutch position relatively to the plate 88, by engaging a stud 101 of the plate 93. Upon withdrawing said trip-arm 99, by means which will be described later, a spring 103, from the plate 88 to the plate 93, causes the plate 93 to rotate to the Figure 8 position, thereby freeing the pawls 91 for said resulting engagement with the toothed-clutch member 86.

The clutch-member 86, pawls 91 and the plate 93 are substantially as shown in Patent No. 1,299,646 to Wood, dated April 8, 1919.

An electric motor 105 is mounted on the back of the typewriter frame 48 so that its output shaft 106 is end to end with and connected by a coupling 107 to an input shaft 108 of a gear-unit or block 109 that is also mounted on the back of said typewriter frame 48. Said gear-unit 109 has two diverging output shafts 111, 112, Figures 2 and 4, the output shaft 111 leading to a carriage-return rack 113 on the carriage 45, and the output shaft 112 pointing toward the cycling shaft gear 82 in the computing base. A pinion 115, having a clutch-tooth 114, meshes with the carriage return rack 113 and is slidable on the shaft 111, into and out of engagement with a clutch-head 116 on said shaft 111, for starting and stopping the carriage return.

The motor-driven input shaft 108 has a worm 118 meshing with worm-wheels 119 and 120 on the diverging output shafts 111, 112, Figure 2. The housing of said gear-unit 109 includes a main body 121 attached to the typewriter-frame 48, as by screws 122, and a head 123 attached to said main body 121, by screws 124. Said main body 121 journals the input shaft 108 and the output shaft 111. A vertical shaft 126, Figures 2 and 4, enables the output shaft 111 to drive the type-action power-shaft 28. A bracket 127 journals the outboard end portion of said output shaft 111, and the upper end portion of the vertical shaft 126. Connecting gears 128, 129, on the shafts 111, 126, are housed within said bracket 127 and a hood 130 attached by screws 131, Figure 2. Said bracket 127 is shown attached, by screws 132, Figure 2, to the main body 121. A boss or block 133, attached to the typewriter frame 48, journals the lower end portion of the vertical shaft 126 and one end of the type-action power-shaft 28, and may be recessed for gears 134, 135 that connect these shafts 28, 126. The other end of said type-action shaft 28 may be journaled in a boss or block 136, Figure 4, attached to the typewriter-frame 48.

The power-gear 82 in the computing base B is driven by the output shaft 111 in the typewriter-unit A. For this purpose, the gear housing 76, in said computing base, journals a short shaft 138 in line with the similarly short output shaft 112, and said shaft 138 has a pinion 139 meshing with said gear 82. These two short shafts, 112 and 138, one in the typewriter and the other in the computing base, are connected by a removable intermediate shaft-section or coupling device 140 that is shown similar to one disclosed in my said application No. 15,789.

Said coupling 140 includes an intermediate shaft-section 141 having articulated joints 142, Figure 2, with the short shafts 112, 138. Retaining sleeves 143, 144 are urged apart by a spring 145 to overlap said joints 142 and keep said shaft-section 141 in place. Said sleeves 143, 144 are retractible to uncover the articulated shaft-portions as in Figure 3, preparatory to removal or replacement of said coupling 140. Figure 4 represents said coupling 140 removed for the indicated separation of the typewriter A and computing base B.

The motor 105 is attached by screws 147 to a supporting bracket 148, attached to the back of the typewriter-frame 48 by screws 149. Said motor 105 is preferably of the high-speed type consonant with compactness; and the described gearing may be proportioned to effect suitably lower speeds at the type-action shaft 28, the carriage return or output shaft 111 and the cycling shaft 70.

While using the machine, the type-action shaft 28, and therefore the motor 105 and shafts 106, 108 and 111, rotate continuously; and the computing-base drive, comprising the shafts 112, 140, 138, the gear 82 and clutch member 86, may rotate continuously too.

A shifter 151 for the carriage-return pinion 115 is mounted on a shaft 152, journaled, Figure 2, in the main body 121 of the gear-unit 109. Means, Figure 2, for working said rock-shaft 152 to start and stop the carriage-return are substantially as shown in my aforementioned Patent 1,679,741, and are therefore briefly described as follows.

A spring-pressed latch-bar 153 is released from a holding plate 154, as by operating a carriage-return key 155, for resulting rearward movement which rocks said shaft 152, by means of linkage 156, to shift the pinion 115 into engagement with the rotating clutch-head 116. The resulting carriage-return movement is limited by the carriage 45 engaging a laterally pre-set dog 157 on a shaft 158, to rock the latter which, in turn, through linkage 159, rocks the shaft 152 to shift said pinion 155 back to the Figure 2 position to disconnect it from the clutch-head 116.

The mechanism controlling the cycling-clutch mechanism in the computing base will now be described.

A cycling key lever 160, Figure 6, when depressed rocks a lever 161 having an arm 161a to thrust a rod 162 rearwardly to rock a lever 163 fastened to a rock-shaft 164 journaled in the framework side-member 63, Figure 4, and a bar 165, Figure 5, supported by the cross-member 77 and a post 166 of the computing base framework. Said key lever 160, lever 161 and thrust rod 162 are mounted at the right side of the typewriter frame 48 as represented in Figure 4 and more fully described in my application 72,348, filed April 2, 1936. Said lever 163 works through a pin and slot connection 167 to rock an intermediate arm 169 which, engaging a side spur 170 of an arm 171, rocks the latter to withdraw the trip-arm 99 to release the spring-pressed control disk 93, said arm 171 being united to said trip-arm 99 by a sleeve 172 which, with said arms 99, 171, is mounted on the rock shaft 164. At the beginning of the ensuing cycle a cam 173, formed on a disk 174 keyed to the cycling shaft 70, depresses an arm 175 to which the intermediate arm 169 is attached by a stud and slot connection 176. Said arm 175 thus depressed draws said intermediate arm 169 downwardly to release the arm 171 and enable the latter to return, together with the trip-arm 99, to a normal position determined by a branch 171a of said arm 171 engaging a stop 177 on the framework as in Figure 7, the return being pressed by a spring 178 attached to the sleeve 172 and to the framework. Thus even though the thrust rod 162 and lever 163 are kept in operated position, Figure 7, through keeping the cycling key lever 160 depressed, the trip-arm 99 will become restored and therefore only one cycle of the shaft 70 can result from any one depression of said cycling key lever 160. That is, the restored trip-arm 99 is effective to intercept the stud 101 on the clutch-pawl control-plate 93, to arrest the latter, whereupon slightly further rotation of the shaft 70 and the pawl plate 83, as limited by the slot and stud connection 97, causes the disconnection of the pawls 91 from the clutch-member 86 through the medium of the pawl control studs 94 on said arrested plate 93.

The single-cycle control arm 175 is pressed by spring 181 and at the end of a cycle becomes restored by following a drop 182 of said cam-disk 174. Should the cycling key lever 160 remain depressed at the end of a cycle so that a shoulder 183 of the intermediate arm 169 remains under the spur 170 of the restored arm 171 as in Figure 7, said arm 175 may become restored independently by reason of its stud and slot connection 176 to said intermediate arm 169.

Upon releasing the cycling key lever 160 a spring 184 attached to the stud of the stud and slot connection 167 becomes effective to restore the lever 163 against the stop 177 and at the same time, through said pin and slot connection 167, rock the intermediate arm 169 counterclockwise of Figure 7, and then lift it back to normal position, Figure 5, should it have become positioned under the spur 170. Said single-cycle-control arm 175 has a cam-roller 185 and is pivoted at 184ª to a plate 180, Figure 4, supported by the framework cross-members 77, 78.

The carriage 45 has, for each computing zone, a tappet-unit 188 which in the present machine includes a tabulating stop 189, a denomination-selecting tappet 190 for engaging the denomination-jacks 191, and one or more tappets 192 for engaging suitable register-selecting trains represented by their terminals 193, Figure 2; since the machine may have a plurality of registers as described, for instance, in my aforesaid application No. 42,611.

For automatic cycle-tripping at a zone, said tappet-unit 188 may rock a lever 195 pivoted to the usual tabulating stop housing 186 on the typewriter frame 48 and having a pin 187 to depress a vertical rod forming a cycling jack 194. Said cycling jack 194, like the denominational jacks 191, is contained in a housing 196 and is shortened at the top to clear the denomination-selecting tappet 190. Depression of said cycling jack 194 depresses a companion rod 197, guided at 200 in the computing base, to rock a bell-crank 198 and a lever 199 having an arm 199ª opposite said bell-crank 198 and an arm 201 offset, Figure 5, by yoke 202 for alignment with an arm 203 fastened to the rock-shaft 164 to which the trip-arm 99 is connected as above described. Thus, at the depression of the cycling jack 194, automatically effected by the carriage 45, said rock-shaft 164 and its lever 163 are rocked to withdraw the trip-arm 99 by means of the intermediate arm 169, arm 171 and sleeve 172 as described before with reference to operation of the manual cycling-key lever 160. At automatically initiated cycling the intermediate arm 169 and its control arm 175 cooperate to prevent unnecessary cycle repetition. That is, the same cycle-repetition-preventing devices are effective not only at manually initiated cycling but also at automatically initiated cycling.

The bell-crank 198 and the lever 199 of the cycling-jack train are shown fulcrumed respectively, Figures 2 and 7, on rods 205, 206. The rod 206 may be supported by brackets 207, Figure 2, on the framework cross-bar 77; and the bell crank rod 205 has a support 208 which may be shiftable for creating a slack in the cycle-jack train to disable the latter, for example, described in my aforementioned application 72,348.

While reciprocating the general operator in the computing base manually by working the handle 69, Figures 2, 4 and 13, the cycling shaft 70 and its crank 71 may remain connected to the general operator side plate 60, since novel means, which will now be described, are provided to aid the idly driven shaft 70 and crank 71 over the dead-center positions. Before the general operator reaches the end of its hand-driven advance stroke a roller 210 mounted on a disk 211 fastened to the concomitantly idly driven crank shaft 70 will have reached such position relatively to a lever 212 that the latter, which is pressed by a spring 213, becomes displaced by said roller 210, say to the position 212ª, Figure 13, and reacts against said roller 210 to aid the shaft 70 and its crank 71 over the dead-center as represented in Figure 13 by the two positions of the crank-roller 72 on opposite sides of the dead-center. This action enables the hand-driven general operator to reach the end of its advance stroke, and start its return stroke to become effective again to drive and continue the idle rotation of the shaft 70 and its crank 71.

Similar action takes place at the end of the hand-driven return stroke of the general operator when another roller 214 on the disk 211 co-operates with the spring-pressed lever 212 to aid the shaft 70 and crank 71 over the dead-center to the normal Figures 2 and 5 position so that another hand-driven reciprocation of the general operator is feasible.

The dead-center-overcoming lever 212 has a fulcrum stud 215 in a bracket 216 on a post 217 of the computing base framework and normally abuts a stop 218 on said bracket 216.

The shaft 70 is thus idly driven a complete revolution at each hand-driven reciprocation of the general operator. Therefore the disk 211 is provided with ratchet teeth 220 to co-operate with a spring-pressed pawl 221, on the fulcrum-stud 215, as a full-stroke device to prevent untimely reversal of the hand-driven general operator advance or return stroke.

The interlock between the digit-type actions, the typewriter, and the cycle-tripping mechanism will now be described, Figures 8, 9, 10, 11 and 14. The type-action draw-links 26 play in slots in the vertical leg of an angle-bar 224 attached to the typewriter frame 48. A longitudinal groove 223, Figures 10, 11, in said vertical leg, and cover-plates 225 retain a series of lock-rods 226 whose endwise displacement or spread is limited by blocks 227 on said angle-bar 224, Figure 10, so as to admit either only one type-action draw-link 26 at a time or a link 228 leading to the cycle-tripping mechanism. Thus when a tongue 229 of the endwise movable link 228 is entered, Figures 8 and 11, between the lock-rods 226 the latter will block entry of any type-action draw-link 26 to prevent it from becoming engaged with the power shaft 28 and the type-actions will thus be locked against operation. Conversely when any digit-type action is being operated its draw-link 26 is entered between the lock-rods 226 rendering the latter effective to block the link 228, Figures 9 and 10. Said lock-link 228 is guided in a slot in the vertical leg of the angle bar 224 and in a slotted plate 230 depending from the typewriter frame 48, and also has a guide slot 231 fitting the horizontal leg of the angular bar 224.

When the trip-arm 99 is withdrawn from the stud 101 of the spring-pressed clutch control disk 93 the resultant trip or movement of the latter to pawl releasing, that is, clutch-closing position, rocks a lever 232, having a cam-arm 233 engaged by said stud 101, counterclockwise to the Figure 8 position, said lever 232 being mounted rotatably loose on the trip shaft 164. Said thus rocked lever 232, having an arm 234 engaging an arm 235 on the rod 206, rocks the latter so that an arm 236 thereon, engaging a shoulder 237 of the lock-link 228, draws the latter rearwardly to close the lock-rods 226 as in Figures 8 and 11. Thus the type actions become locked against operation immediately, that is, as soon as the clutch is closed, without waiting for the cycle to get under way.

Conversely, if the cycling clutch is tripped, while a type-action is being operated and draw-link 26 of the latter is entered between the lock-rods 226, the lock-link 228 will be blocked and cause the cam-arm 233 to be arrested in such position, Figure 9, as to oppose full movement of the tripped clutch-control disk 93 and thereby arrest the closing of the pawls 91 on the clutch member 86. But as soon as the type-action draw-link 26 clears the lock-rods 226, this occurring when the operated type-action is well on its way from its recoil stroke, and any depressed pin-setting bar 51 has risen clear of the register bar pins 53, the lock-link 228 may enter between the lock-rods 226, thereby freeing the tripped spring-pressed clutch control disk 93 to complete the closing of the clutch.

The cam-arm 233 has a dwell 233ª against which the control-disk stud 101 stays, Figure 8, to keep the lock-link 228 in type-action-locking position until the cycling-shaft cam 173 has displaced the arm 175 which then becomes effective to stay the lock-link 228 against restoration by its spring 238. For this purpose a link 239 connects said arm 175 to an arm 240 of the rock-shaft rod 206, and a pin-and-slot connection 241 enables said rod 206 to be rocked to locking position independently of said arm 175. When said arm 175 becomes restored near the end of the cycle by following the cam-disk drop 182, the spring 238 restores the lock-link 228 and rock-shaft 206 to normal position in which the framework cross-member 77 stops a rock shaft arm 242. The rod or rock-shaft 206, used also as a fulcrum for the lever 199 of the automatic cycling tripping train, Figure 14, has said lever 199 rotatably loose thereon. For regulating the arrest, Figure 9, of the closure or release of the clutch pawls 91, the arresting cam-arm 233 may be adjusted by means of an adjustable knuckle 243 in the companion arm 234.

In a machine having hand operated type actions, Figure 1, key-lever 31ª, when depressed, works through a shoulder 49ᵇ on its pendent pin-setting rod 49ª, to close a series of lock rods 244, retained in a slotted cross-bar 245, which guides said pendent rods 49ª, and is attached to the typewriter frame 48, said lock rods 244 being similar to the above described lock rods 226. A lock-link 246 connects an arm 247, of the rock shaft 206, and a bell crank 248 pivoted to a bracket 245ª of the cross-bar 245. An arm 249 of said bell crank 248 enters and closes said lock rods 244, when the cycling clutch is tripped and said shaft 206 is concomitantly rocked as above described. Conversely, when a type action, Figure 1, is being hand operated the closing of the lock rods 244 by the pendent rod 49ª blocks the train, comprising said bell crank 248, link 246, rock-shaft 206, arm 235 and lever 232 to prevent, substantially like in Figure 9, closing of the cycling clutch, the lever 232 not being shown in Figure 1.

In the machine having the hand-operated type-actions, the motor 105 may be normally at rest; and a motor-switch 250, Figure 12, housed in the motor-bracket 146, is worked by a rod 251, Figure 2, connected to the carriage-return-control linkages 156, 159, substantially as in my aforesaid Patent 1,679,741, for starting and stopping the motor for carriage-returns. In such machine, the normally silent motor may also be started and stopped, consonantly with closing and opening the cycling clutch in the computing base, through switch-contacts 252, represented in dotted outline in Figure 4 as being mounted on the plate 180, said contacts 252 being controlled by the clutch-control plate 93 substantially as in the aforesaid Wood Patent 1,299,646. Figure 12 represents the electrical connections for the motor 105, switches 250, 252, power-line plug 253, and separable connections 254 between the type-carriage and computing base.

The bearing-unit 75 for the cycling shaft 70 may be formed as in Figure 4 with a recess 255 which may be packed for lubrication and covered by a removable plate 255ª.

A clamp-screw 256, Figure 5, fastens the crank 71, split at 257, to the crank-shaft 70. An eccentric bushing 258 is turned for adjusting the crank-engaged plate 60 relatively to its companion rack 62 for adjusting the general-operator cross-bar relatively to the throw of the crank 71, said plate 60 being then secured to its rack 62 by screws 259.

The register bars 52 work in the usual comb-plates 260, 261, attached to the computing-base framework. Carry-over mechanism (not shown) for the computing wheels 56 may be of the kind shown in my aforesaid Patent 1,927,951. For its support by the computing base B, the typewriter A has attached, by screws 262, base-flange plates 263, Figures 2 and 4, which rest on the cross-member 77 and a cross-member 265 of the computing-base framework, and are attached thereto by screws 264. The gear-housing 76 has, for the short shaft 136, a bushing 266, removably held in place by a pin 267. The head 123 of the gear-unit 109 in the typewriter has a bushing 268, for the short shaft 112, secured by a pin 269. Said short shaft 112 may be extended to also bear in a bushing 270 of said head 123.

It will be seen now that in the described transmission mechanism, wherein the motor 105 is incorporated in the typewriter-unit A and is connected to drive not only the output or carriage-return shaft 111 but also the cycling shaft 70 in the computing base B, the latter itself becomes rid of the motor. The portion of the transmission mechanism in the computing base B thus becomes simple and compact, since said portion comprises substantially only the bearing unit 75, the gear-housing 76 and the single cross-shaft line, namely, the crank-shaft 70, which also mounts the clutch parts 86, 89, 93 and the disks 211 and 174. By means of the vertical shaft 126 in the typewriter said motor 105 is also enabled to drive the type-action shaft 28 from said output or carriage-return shaft 111. By reason of the crank-dead-center overcoming provision, the general operator in the computing base may be cycled by means of the handle 69, without first disconnecting the general operator from the transmission mechanism.

The upward and forward slant, Figure 2, of the shaft-line from the power-gear 82 in the computing base to the driving worm 118 on the motor-shaft line in the typewriter is consonant with having said motor-shaft line substantially close to the back of the typewriter-frame and arranging the cycling shaft 70 within a cross-sectionally compact department at the rear of the computing base.

The worm 118 and the several gears 119, 120, 128, 129, 134, 135 and 139 are keyed to their respective shafts as represented in Figures 2 and 4.

Variations may be resorted to within the scope of the invention, and portions of the improvements may be used without others.

Having thus described my invention, I claim:

1. In combination with a combined typewriter and computing machine comprising a computing base containing computing mechanism, and a general operator therefor to be operable by power, and also comprising a typewriter surmounting said computing base and having a main frame, and typing mechanism to be operable by power; a power drive for said machine including an upright stub shaft journaled in the computing base, said computing base being extended rearwardly to dispose said stub shaft beyond the back of the typewriter frame, means in said base operatively connecting said stub shaft to said general operator, a power operable drive shaft having its bearing support attached to the typewriter frame and disposed by its said support behind the back of said frame to extend transversely thereof and above said stub shaft, means, incorporated in the typewriter, operatively connecting said typing mechanism to said drive shaft, a shaft geared to said drive shaft and having a bearing in a support attached to the typewriter frame, said latter support disposing said latter shaft to extend downwardly toward said stub shaft, and a coupling detachably connecting said latter shaft to said stub shaft.

2. In combination with a combined typewriter and computing machine comprising a computing base containing computing mechanism, and a general operator therefor to be operable by power, and also comprising a typewriter surmounting said computing base and having a main frame, and typing mechanism to be operable by power; a power drive for said machine including an upright stub shaft journaled in the computing base, said computing base being extended rearwardly to dispose said stub shaft beyond the back of the typewriter frame, means in said base operatively connecting said stub shaft to said general operator, a motor, having a drive shaft, mounted on the typewriter frame so that said drive shaft is disposed behind the back of said frame and extends transversely thereof and is above said stub shaft, and a reduction gear block mounted on said typewriter frame above said stub shaft and having an input shaft driven by said motor shaft, said gear block including an output shaft operatively connected to said typing mechanism and another output shaft extending downwardly toward said stub shaft, and a coupling detachably connecting the latter output shaft to said stub shaft.

HENRY L. PITMAN.